United States Patent
Motchenbacher et al.

(10) Patent No.: US 11,077,497 B2
(45) Date of Patent: Aug. 3, 2021

(54) DEOXIDATION OF METAL POWDERS

(71) Applicant: Global Titanium Inc., Detroit, MI (US)

(72) Inventors: Charles A. Motchenbacher, Rochester Hills, MI (US); Robert L. Swenson, Rochester, MI (US); Jesse Z. Oliver, White Lake, MI (US)

(73) Assignee: Global Titanium Inc., Detroit, MI (US)

( * ) Notice: Subject to any disclaimer, the term of this patent is extended or adjusted under 35 U.S.C. 154(b) by 523 days.

(21) Appl. No.: 15/852,211

(22) Filed: Dec. 22, 2017

(65) Prior Publication Data

US 2018/0354032 A1 Dec. 13, 2018

Related U.S. Application Data

(60) Provisional application No. 62/516,623, filed on Jun. 7, 2017.

(51) Int. Cl.
| | |
|---|---|
| *B22F 1/00* | (2006.01) |
| *B22F 9/04* | (2006.01) |
| *B33Y 70/00* | (2020.01) |
| *B22F 10/20* | (2021.01) |

(52) U.S. Cl.
CPC .......... *B22F 1/0088* (2013.01); *B22F 1/0048* (2013.01); *B22F 9/04* (2013.01); *B33Y 70/00* (2014.12); *B22F 10/20* (2021.01); *B22F 2201/20* (2013.01); *B22F 2301/205* (2013.01); *B22F 2304/10* (2013.01); *B22F 2998/10* (2013.01); *B22F 2999/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,834,667 | A * | 5/1958 | Rostron | C22B 34/1268 419/33 |
| 4,519,837 | A * | 5/1985 | Down | B22F 9/20 75/369 |
| 4,952,144 | A | 8/1990 | Hansz et al. | |
| 5,022,935 | A * | 6/1991 | Fisher | C22B 3/06 148/27 |
| 5,211,775 | A | 5/1993 | Fisher et al. | |
| 6,312,642 | B1 | 11/2001 | Fife | |
| 6,322,912 | B1 | 11/2001 | Fife | |
| 6,373,685 | B1 | 4/2002 | Kimmel et al. | |
| 6,391,275 | B1 | 5/2002 | Fife | |
| 6,462,934 | B2 | 10/2002 | Kimmel et al. | |
| 6,527,938 | B2 | 3/2003 | Bales et al. | |
| 6,569,397 | B1 | 5/2003 | Yadav et al. | |
| 6,576,099 | B2 | 6/2003 | Kimmel et al. | |
| 6,639,787 | B2 | 10/2003 | Kimmel et al. | |
| 8,124,187 | B2 | 2/2012 | Su et al. | |
| 8,388,814 | B2 * | 3/2013 | Guskov | B01J 19/006 204/164 |
| 8,449,813 | B1 * | 5/2013 | Lim | B22F 1/0088 266/171 |
| 9,206,085 | B2 | 12/2015 | Hadidi et al. | |
| 2004/0188261 | A1 | 9/2004 | Monni et al. | |
| 2004/0226630 | A1 | 11/2004 | Koenitzer et al. | |
| 2005/0008564 | A1 | 1/2005 | Reed et al. | |
| 2005/0025699 | A1 | 2/2005 | Reed et al. | |
| 2006/0130610 | A1 | 6/2006 | Ward-Close et al. | |
| 2007/0130656 | A1 | 6/2007 | Boulos et al. | |
| 2008/0229880 | A1 | 9/2008 | McCracken et al. | |
| 2008/0233420 | A1 | 9/2008 | McCracken et al. | |
| 2009/0095130 | A1 | 4/2009 | Smokovich et al. | |
| 2009/0129961 | A1 | 5/2009 | Lavoie et al. | |
| 2009/0214378 | A1 * | 8/2009 | Haas | B22F 9/22 420/427 |
| 2009/0250336 | A1 * | 10/2009 | Gustov | B01J 19/006 204/164 |
| 2010/0061925 | A1 * | 3/2010 | Lee | C01B 6/02 423/645 |
| 2011/0129399 | A1 | 6/2011 | Xie et al. | |
| 2011/0150695 | A1 | 6/2011 | Ranganathan et al. | |
| 2013/0127097 | A1 * | 5/2013 | Lim | C22C 1/06 266/251 |

(Continued)

FOREIGN PATENT DOCUMENTS

| | | |
|---|---|---|
| CN | 102363218 A | 2/2012 |
| CN | 106334791 A | 1/2017 |

(Continued)

OTHER PUBLICATIONS

Espacenet machine translation of CN106334791 (Year: 2020).*
Alcock, C. B., Itkin, V. P., and Horrigan, M. K., "Vapor Pressure of the Metallic Elements—Equations", Canadian Metallurgical Quarterly, 23, 309, 1984. (Year: 1984).*
Kim et al., "Thermodynamic Evaluation of Oxygen Behavior in Ti Powder Deoxidized by Ca Reductant", Met. Mater. Int., vol. 22, No. 4 (2016), pp. 658-662, doi: 10.1007/s12540-016-6111-9 (Year: 2016).*

*Primary Examiner* — Coris Fung
*Assistant Examiner* — Christopher D. Moody
(74) *Attorney, Agent, or Firm* — Quinn IP Law

(57) ABSTRACT

Systems, methods, and compositions disclosed herein provide for low-oxygen metal powders. These metal powders, such as very-fine powders and spherical powders of titanium and titanium alloys, can be effectively deoxidized through use of vapor deoxidation without requiring the powder to undergo re-sizing or re-shaping subsequent to the deoxidation. Systems, methods, and compositions in accordance with the present disclosure can produce low-cost, low-oxygen, metal powders, such as very-fine powders and spherical powders of, for example, titanium and titanium alloys. Moreover, systems, methods, and compositions in accordance with the present disclosure can provide for reducing the number of processes or cost of processes required to produce these low-oxygen metal powders.

17 Claims, No Drawings

(56) References Cited

U.S. PATENT DOCUMENTS

| | | | |
|---|---|---|---|
| 2014/0131906 A1 | 5/2014 | Hadidi et al. | |
| 2015/0034123 A1* | 2/2015 | Pressacco | B08B 5/02 134/10 |
| 2017/0095858 A1* | 4/2017 | Stankowski | B33Y 10/00 |
| 2017/0113273 A1* | 4/2017 | Fang | C22C 14/00 |

FOREIGN PATENT DOCUMENTS

| | | |
|---|---|---|
| EP | 2107862 A1 | 10/2009 |
| KR | 20070051957 A | 5/2007 |
| KR | 100726817 B1 | 6/2007 |
| KR | 20080047167 A | 5/2008 |
| KR | 101135160 B1 | 4/2012 |
| KR | 101259434 B1 | 4/2013 |
| KR | 101435481 B1 | 8/2014 |
| WO | 2012164288 A3 | 12/2012 |

\* cited by examiner

DEOXIDATION OF METAL POWDERS

CROSS-REFERENCE TO RELATED APPLICATIONS

This application claims the benefit of U.S. Provisional Application No. 62/516,623, filed Jun. 7, 2017, which is hereby incorporated in its entirety.

INTRODUCTION

The disclosure relates to the field of metal powders and, more specifically, to deoxidation of metal powders such as titanium and titanium alloys.

Interstitial oxygen in titanium and titanium alloys acts as a strengthener and alpha phase stabilizer. The included oxygen reduces elongation and ductility, which generally limits the performance of the material. This means that upper limits of oxygen content are set by application and desired performance. For example, the upper limit of some commercial applications may be set at 2000 parts-per-million while the upper limit for commercial applications requiring relatively higher ductility may be set at 1300 parts-per-million.

Spherical powders of metals are effective in additive manufacturing for, among other reasons, their ability to form powders having desirable flow properties. However, the cost of manufacturing these spherical powders is relatively high. For example, spherical powders of metals for additive manufacturing generally employ high-cost plasma and gas atomization of a wire of the metal.

Moreover, during additive manufacturing, only a small portion of the powder used is fused or melted to form a resultant part. The unused portion of the powder may be reused in later additive manufacturing processes, but the lifespan of the powder is limited because the unused powder scavenges oxygen with each process. This is particularly true when the powder is exposed to the temperatures required to fuse the powder and to form the resultant part. This oxygen scavenging renders the spherical powder unusable after a certain number of cycles.

Deoxidizing processes are carried out at high temperatures. These temperatures are sufficient to cause diffusion bonding of the metal powders. This effectively welds the metal particles together such that these particles cannot be separated without undergoing re-sizing or re-shaping processes. Accordingly, processes that risk fusion of fine particles are performed prior to processes that size and shape the metal particles.

SUMMARY

It is desirable to reduce the oxygen content of powders used in, for example, additive manufacturing. Surprisingly, powders such as very-fine powders and spherical powders of, for example, titanium and titanium alloys can be effectively deoxidized through use of vapor deoxidation, without requiring the titanium powder to undergo re-sizing or re-shaping subsequent to the deoxidation. Beneficially, systems, methods, and compositions in accordance with the present disclosure can produce low-cost, low-oxygen, powders such as very-fine powders and spherical powders of, for example, titanium and titanium alloys. Moreover, systems, methods, and compositions in accordance with the present disclosure can provide for reducing the number of processes or cost of processes required to produce these low-oxygen powders.

According to aspects of the present disclosure, a method includes obtaining a high-oxygen very-fine powder including titanium, adding an amount of deoxidant to the high-oxygen very-fine powder to thereby produce a powder blend, applying a vacuum to the powder blend, heating the powder blend to a predetermined temperature sufficient to at least partially vaporize the deoxidant at a pressure of the vacuum, maintaining the powder blend at the predetermined temperature for a predetermined time to produce a very-fine-powder cake, milling the very-fine-powder cake to produce a low-oxygen very-fine-powder blend, and removing an oxidized deoxidant from the low-oxygen very-fine-powder blend to thereby produce a low-oxygen very-fine powder. The very-fine-powder cake includes the low-oxygen very-fine powder and the oxidized deoxidant. The low-oxygen very-fine powder includes the titanium. The predetermined time is sufficient to convert the high-oxygen very-fine powder to the low-oxygen very-fine powder.

According to further aspects of the present disclosure, the low-oxygen very-fine powder has an oxygen content of less than about 2000 parts-per-million.

According to further aspects of the present disclosure, the low-oxygen very-fine powder has an oxygen content of less than about 1300 parts-per-million.

According to further aspects of the present disclosure, the low-oxygen very-fine powder has an oxygen content of less than about 1100 parts-per-million.

According to further aspects of the present disclosure, the low-oxygen very-fine powder has an oxygen content of less than about 800 parts-per-million.

According to further aspects of the present disclosure, the low-oxygen very-fine powder has an oxygen content of less than about 500 parts-per-million.

According to further aspects of the present disclosure, removing the oxidized deoxidant comprises chemically treating the low-oxygen very-fine-powder blend to remove the oxidized deoxidant.

According to further aspects of the present disclosure, the high-oxygen very-fine powder is spherical titanium having a first particle-size distribution and the low-oxygen very-fine powder is spherical titanium having a second particle-size distribution. The second particle-size distribution is substantially equal to the first particle-size distribution.

According to further aspects of the present disclosure, the high-oxygen very-fine powder is spent powder.

According to further aspects of the present disclosure, the high-oxygen very-fine powder is produced via hydride-milling-dehydride processing.

According to further aspects of the present disclosure, the predetermined temperature is less than about 1900° F.

According to further aspects of the present disclosure, the predetermined temperature is less than about 1700° F.

According to further aspects of the present disclosure, the predetermined temperature is less than about 1500° F.

According to further aspects of the present disclosure, the high-oxygen very-fine powder defines a first particle-size distribution and the low-oxygen very-fine powder defines a second particle-size distribution that is substantially equal to the first particle-size distribution.

According to further aspects of the present disclosure, the low-oxygen very-fine powder is configured for use in additive manufacturing processes without further alteration to physical properties of powder particles.

According to further aspects of the present disclosure, the high-oxygen very-fine powder defines an average particle size of less than about 105 μm.

According to further aspects of the present disclosure, the high-oxygen very-fine powder defines an average particle size of less than about 63 μm.

According to further aspects of the present disclosure, the high-oxygen very-fine powder defines an average particle size of less than about 45 μm.

According to further aspects of the present disclosure, the high-oxygen very-fine powder defines an average particle size of less than about 25 μm.

According to aspects of the present disclosure, a low-oxygen very-fine powder prepared by a process including obtaining a high-oxygen very-fine powder including titanium, adding an amount of deoxidant to the high-oxygen very-fine powder to thereby produce a powder blend, applying a vacuum to the powder blend, heating the powder blend to a predetermined temperature sufficient to at least partially vaporize the deoxidant at a pressure of the vacuum, maintaining the powder blend at the predetermined temperature for a predetermined time to produce a very-fine-powder cake, milling the very-fine-powder cake to produce a low-oxygen very-fine-powder blend, and removing an oxidized deoxidant from the low-oxygen very-fine-powder blend to thereby produce a low-oxygen very-fine powder. The very-fine-powder cake includes the low-oxygen very-fine powder and the oxidized deoxidant. The low-oxygen very-fine powder includes the titanium. The predetermined time is sufficient to convert the high-oxygen very-fine powder to the low-oxygen very-fine powder.

According to further aspects of the present disclosure, the low-oxygen very-fine powder has an oxygen content of less than about 2000 parts-per-million.

According to further aspects of the present disclosure, the low-oxygen very-fine powder has an oxygen content of less than about 1300 parts-per-million.

According to further aspects of the present disclosure, the low-oxygen very-fine powder has an oxygen content of less than about 1100 parts-per-million.

According to further aspects of the present disclosure, the low-oxygen very-fine powder has an oxygen content of less than about 800 parts-per-million.

According to further aspects of the present disclosure, the low-oxygen very-fine powder has an oxygen content of less than about 500 parts-per-million.

According to further aspects of the present disclosure, removing the oxidized deoxidant comprises chemically treating the low-oxygen very-fine-powder blend to remove the oxidized deoxidant.

According to further aspects of the present disclosure, the high-oxygen very-fine powder is spherical titanium having a first particle-size distribution and the low-oxygen very-fine powder is spherical titanium having a second particle-size distribution. The second particle-size distribution is substantially equal to the first particle-size distribution.

According to further aspects of the present disclosure, the high-oxygen very-fine powder is spent powder.

According to further aspects of the present disclosure, the high-oxygen very-fine powder is produced via hydride-milling-dehydride processing.

According to further aspects of the present disclosure, the predetermined temperature is less than about 1900° F.

According to further aspects of the present disclosure, the predetermined temperature is less than about 1700° F.

According to further aspects of the present disclosure, the predetermined temperature is less than about 1500° F.

According to further aspects of the present disclosure, the high-oxygen very-fine powder defines a first particle-size distribution and the low-oxygen very-fine powder defines a second particle-size distribution that is substantially equal to the first particle-size distribution.

According to further aspects of the present disclosure, the low-oxygen very-fine powder is configured for use in additive manufacturing processes without further alteration to physical properties of powder particles.

According to further aspects of the present disclosure, the high-oxygen very-fine powder defines an average particle size of less than about 105 μm.

According to further aspects of the present disclosure, the high-oxygen very-fine powder defines an average particle size of less than about 63 μm.

According to further aspects of the present disclosure, the high-oxygen very-fine powder defines an average particle size of less than about 45 μm.

According to further aspects of the present disclosure, the high-oxygen very-fine powder defines an average particle size of less than about 25 μm.

According to aspects of the present disclosure, a very-fine-powder cake is prepared by a process including obtaining a high-oxygen very-fine powder including titanium, adding an amount of deoxidant to the high-oxygen very-fine powder to thereby produce a powder blend, applying a vacuum to the powder blend, heating the powder blend to a predetermined temperature sufficient to at least partially vaporize the deoxidant at a pressure of the vacuum, maintaining the powder blend at the predetermined temperature for a predetermined time to produce the very-fine-powder cake. The very-fine-powder cake includes a low-oxygen very-fine powder and an oxidized deoxidant. The low-oxygen very-fine powder includes the titanium. The predetermined time is sufficient to convert the high-oxygen very-fine powder to a low-oxygen very-fine powder.

According to further aspects of the present disclosure, the low-oxygen very-fine powder has an oxygen content of less than about 2000 parts-per-million.

According to further aspects of the present disclosure, the low-oxygen very-fine powder has an oxygen content of less than about 1300 parts-per-million.

According to further aspects of the present disclosure, the low-oxygen very-fine powder has an oxygen content of less than about 1100 parts-per-million.

According to further aspects of the present disclosure, the low-oxygen very-fine powder has an oxygen content of less than about 800 parts-per-million.

According to further aspects of the present disclosure, the low-oxygen very-fine powder has an oxygen content of less than about 500 parts-per-million.

According to further aspects of the present disclosure, the high-oxygen very-fine powder is spherical titanium having a first particle-size distribution and the low-oxygen very-fine powder is spherical titanium having a second particle-size distribution. The second particle-size distribution is substantially equal to the first particle-size distribution.

According to further aspects of the present disclosure, the high-oxygen very-fine powder is spent powder.

According to further aspects of the present disclosure, the high-oxygen very-fine powder is produced via hydride-milling-dehydride processing.

According to further aspects of the present disclosure, the predetermined temperature is less than about 1900° F.

According to further aspects of the present disclosure, the predetermined temperature is less than about 1700° F.

According to further aspects of the present disclosure, the predetermined temperature is less than about 1500° F.

According to further aspects of the present disclosure, the high-oxygen very-fine powder defines a first particle-size distribution and the low-oxygen very-fine powder defines a second particle-size distribution that is substantially equal to the first particle-size distribution.

According to further aspects of the present disclosure, the low-oxygen very-fine powder is configured for use in additive manufacturing processes without further alteration to physical properties of powder particles.

According to further aspects of the present disclosure, the high-oxygen very-fine powder defines an average particle size of less than about 105 µm.

According to further aspects of the present disclosure, the high-oxygen very-fine powder defines an average particle size of less than about 63 µm.

According to further aspects of the present disclosure, the high-oxygen very-fine powder defines an average particle size of less than about 45 µm.

According to further aspects of the present disclosure, the high-oxygen very-fine powder defines an average particle size of less than about 25 µm.

According to methods of the present disclosure, a method includes obtaining a high-oxygen spherical powder including titanium, adding an amount of deoxidant to the high-oxygen spherical powder to thereby produce a powder blend, applying a vacuum to the powder blend, heating the powder blend to a predetermined temperature sufficient to at least partially vaporize the deoxidant at a pressure of the vacuum, maintaining the powder blend at the predetermined temperature for a predetermined time to produce a spherical-powder cake, milling the spherical-powder cake to produce a low-oxygen spherical-powder blend; and removing an oxidized deoxidant from the low-oxygen spherical-powder blend to thereby produce a low-oxygen spherical powder. The high-oxygen spherical powder defines a first particle-size distribution. The spherical-powder cake includes the low-oxygen spherical powder and the oxidized deoxidant. The low-oxygen spherical powder includes the titanium. The low-oxygen spherical powder defines a second particle-size distribution that is substantially equal to the first particle-size distribution. The predetermined time is sufficient to convert the high-oxygen spherical powder to the low-oxygen spherical powder.

According to further aspects of the present disclosure, the low-oxygen spherical powder has an oxygen content of less than about 2000 parts-per-million.

According to further aspects of the present disclosure, the low-oxygen spherical powder has an oxygen content of less than about 1300 parts-per-million.

According to further aspects of the present disclosure, the low-oxygen spherical powder has an oxygen content of less than about 1100 parts-per-million.

According to further aspects of the present disclosure, the low-oxygen spherical powder has an oxygen content of less than about 800 parts-per-million.

According to further aspects of the present disclosure, the low-oxygen spherical powder has an oxygen content of less than about 500 parts-per-million.

According to further aspects of the present disclosure, removing the oxidized deoxidant comprises chemically treating the low-oxygen spherical-powder blend to remove the oxidized deoxidant.

According to further aspects of the present disclosure, the high-oxygen spherical powder is spent powder.

According to further aspects of the present disclosure, the high-oxygen spherical powder is produced via hydride-milling-dehydride processing.

According to further aspects of the present disclosure, the predetermined temperature is less than about 1900° F.

According to further aspects of the present disclosure, the predetermined temperature is less than about 1700° F.

According to further aspects of the present disclosure, the predetermined temperature is less than about 1500° F.

According to further aspects of the present disclosure, the low-oxygen spherical powder is configured for use in additive manufacturing processes without further alteration to physical properties of powder particles.

According to further aspects of the present disclosure, the high-oxygen spherical powder defines an average particle size of less than about 105 µm.

According to further aspects of the present disclosure, the high-oxygen spherical powder defines an average particle size of less than about 63 µm.

According to further aspects of the present disclosure, the high-oxygen spherical powder defines an average particle size of less than about 45 µm.

According to further aspects of the present disclosure, the high-oxygen spherical powder defines an average particle size of less than about 25 µm.

According to aspects of the present disclosure, a low-oxygen spherical powder is prepared by a process including obtaining a high-oxygen spherical powder including titanium, adding an amount of deoxidant to the high-oxygen spherical powder to thereby produce a powder blend, applying a vacuum to the powder blend, heating the powder blend to a predetermined temperature sufficient to at least partially vaporize the deoxidant at a pressure of the vacuum, maintaining the powder blend at the predetermined temperature for a predetermined time to produce a spherical-powder cake, milling the spherical-powder cake to produce a low-oxygen spherical-powder blend, and removing an oxidized deoxidant from the low-oxygen spherical-powder blend to thereby produce the low-oxygen spherical powder. The high-oxygen spherical powder defines a first particle-size distribution. The spherical-powder cake includes the low-oxygen spherical powder and the oxidized deoxidant. The low-oxygen spherical powder includes the titanium. The low-oxygen spherical powder defines a second particle-size distribution that is substantially equal to the first particle-size distribution. The predetermined time is sufficient to convert the high-oxygen spherical powder to the low-oxygen spherical powder;

According to further aspects of the present disclosure, the low-oxygen spherical powder has an oxygen content of less than about 2000 parts-per-million.

According to further aspects of the present disclosure, the low-oxygen spherical powder has an oxygen content of less than about 1300 parts-per-million.

According to further aspects of the present disclosure, the low-oxygen spherical powder has an oxygen content of less than about 1100 parts-per-million.

According to further aspects of the present disclosure, the low-oxygen spherical powder has an oxygen content of less than about 800 parts-per-million.

According to further aspects of the present disclosure, the low-oxygen spherical powder has an oxygen content of less than about 500 parts-per-million.

According to further aspects of the present disclosure, removing the oxidized deoxidant comprises chemically treating the low-oxygen spherical-powder blend to remove the oxidized deoxidant.

According to further aspects of the present disclosure, the high-oxygen spherical powder is spent powder.

According to further aspects of the present disclosure, the high-oxygen spherical powder is produced via hydride-milling-dehydride processing.

According to further aspects of the present disclosure, the predetermined temperature is less than about 1900° F.

According to further aspects of the present disclosure, the predetermined temperature is less than about 1700° F.

According to further aspects of the present disclosure, the predetermined temperature is less than about 1500° F.

According to further aspects of the present disclosure, the low-oxygen spherical powder is configured for use in additive manufacturing processes without further alteration to physical properties of powder particles.

According to further aspects of the present disclosure, the high-oxygen spherical powder defines an average particle size of less than about 105 µm.

According to further aspects of the present disclosure, the high-oxygen spherical powder defines an average particle size of less than about 63 µm.

According to further aspects of the present disclosure, the high-oxygen spherical powder defines an average particle size of less than about 45 µm.

According to further aspects of the present disclosure, the high-oxygen spherical powder defines an average particle size of less than about 25 µm.

According to aspects of the present disclosure, a spherical-powder cake is prepared by a process including obtaining a high-oxygen spherical powder including titanium, adding an amount of deoxidant to the high-oxygen spherical powder to thereby produce a powder blend, applying a vacuum to the powder blend, heating the powder blend to a predetermined temperature sufficient to at least partially vaporize the deoxidant at a pressure of the vacuum, and maintaining the powder blend at the predetermined temperature for a predetermined time to produce the spherical-powder cake. The high-oxygen spherical powder defines a first particle-size distribution. The spherical-powder cake includes a low-oxygen spherical powder and an oxidized deoxidant. The low-oxygen spherical powder includes the titanium. The low-oxygen spherical powder defines a second particle-size distribution that is substantially equal to the first particle-size distribution. The predetermined time is sufficient to convert the high-oxygen spherical powder to the low-oxygen spherical powder.

According to further aspects of the present disclosure, the low-oxygen spherical powder has an oxygen content of less than about 2000 parts-per-million.

According to further aspects of the present disclosure, the low-oxygen spherical powder has an oxygen content of less than about 1300 parts-per-million.

According to further aspects of the present disclosure, the low-oxygen spherical powder has an oxygen content of less than about 1100 parts-per-million.

According to further aspects of the present disclosure, the low-oxygen spherical powder has an oxygen content of less than about 800 parts-per-million.

According to further aspects of the present disclosure, the low-oxygen spherical powder has an oxygen content of less than about 500 parts-per-million.

According to further aspects of the present disclosure, the high-oxygen spherical powder is spent powder.

According to further aspects of the present disclosure, the high-oxygen spherical powder is produced via hydride-milling-dehydride processing.

According to further aspects of the present disclosure, the predetermined temperature is less than about 1900° F.

According to further aspects of the present disclosure, the predetermined temperature is less than about 1700° F.

According to further aspects of the present disclosure, the predetermined temperature is less than about 1500° F.

According to further aspects of the present disclosure, the low-oxygen spherical powder is configured for use in additive manufacturing processes without further alteration to physical properties of powder particles.

According to further aspects of the present disclosure, the high-oxygen spherical powder defines an average particle size of less than about 105 µm.

According to further aspects of the present disclosure, the high-oxygen spherical powder defines an average particle size of less than about 63 µm.

According to further aspects of the present disclosure, the high-oxygen spherical powder defines an average particle size of less than about 45 µm.

According to further aspects of the present disclosure, the high-oxygen spherical powder defines an average particle size of less than about 25 µm.

The above features and advantages and other features and advantages of the present disclosure are readily apparent from the following detailed description for carrying out the disclosure.

DETAILED DESCRIPTION

Systems, methods, and compositions in accordance with the present disclosure can produce low-cost, low-oxygen, very-fine powders of, for example, titanium and titanium alloys. "Very-fine powders" are powders that have an average particle size less than about 105 µm. In some aspects, the average particle size of the very-fine powder is less than about 63 µm, less than about 45 µm, or even less than about 25 µm. As particle size decreases, the ratio of surface area to volume increases, which generally increases the oxygen content of the powder.

Deoxidation processes can lead to fusion of the powders. If fusion occurs, the particles will have to be subjected to subsequent processes, such as re-sizing or re-shaping, which can increase the oxygen content of the powders. Accordingly, fusion during deoxidation can increase batch-to-batch variability of oxygen content or even render the deoxidation wholly superfluous.

In accordance with the present disclosure, relatively low-temperature vapor-phase deoxidation is employed to deoxidize very-fine powders while inhibiting fusion of the powders. Beneficially, the vapor-phase deoxidation allows lower-cost manufacturing processes to be employed that would otherwise produce very-fine powders having high oxygen concentrations. Further, in accordance with the present disclosure, the overall number of processes performed on the very-fine powders may be optimized to reduce the cost of producing the low-oxygen very-fine powders. Yet further, in accordance with the present disclosure, the number of processes performed subsequent to deoxidation of the powders may be optimized to reduce the amount of interstitial oxygen in the resultant very-fine powder.

According to aspects of the present disclosure, a low-cost, low-oxygen, very-fine powder is produced from titanium metal or other forms of titanium including, for example, solids, turnings, cobbles, sponge, combinations thereof, and the like. The titanium is processed to produce a high-oxygen very-fine powder.

In some aspects, the titanium metal or other forms of titanium may be processed using hydride-milling-dehydride ("HDH") processing of titanium to produce the high-oxygen very-fine powder in the form of an angular-titanium powder. For example, the oxygen content of many HDH-produced powders is approximately 10,000 parts-per-million. Optionally, the angular-titanium powder may be converted to a spherical-titanium powder using, for example, plasma spheroidization.

The high-oxygen very-fine powder is then mixed with an amount of deoxidant to produce a powder blend. The deoxidant is configured to remove oxygen from the high-oxygen very-fine powder by having a higher affinity for oxygen than the very-fine powder. In some aspects, the deoxidant is an alkaline earth metal. In some aspects, the deoxidant is calcium such as granulated calcium metal. For example, under given reaction conditions, calcium vapor has a higher affinity for oxygen than titanium powder and, thus, is able remove oxygen from the very-fine powder by forming calcium oxide.

The powder blend is placed into a container and a vacuum is applied. A pressure of the vacuum is selected to provide for vaporization of the deoxidant below a predetermined temperature and to provide for deoxidation of the high-oxygen very-fine powder within a predetermined time period that will not substantially fuse particles of the high-oxygen very-fine powder. In some aspects, the pressure of the vacuum is less than about 300 $torr_a$. In some aspects, the pressure of the vacuum is less than about 100 $torr_a$. In some aspects, the pressure of the vacuum is less than about 1 $torr_a$.

Beneficially, as the vacuum increases (e.g., absolute pressure decreases), the temperature of vaporization for the deoxidant decreases. This reduced temperature also reduces the probability of sintering or diffusion bonding of the very-fine powders because the lower temperatures make forming diffusion bonds more difficult. In some aspects, the predetermined temperature is less than about 1900° F. In some aspects, the predetermined temperature is less than about 1700° F. In some aspects, the predetermined temperature is less than about 1500° F.

Surprisingly, the time period required for deoxidation is decreased through use of vaporized deoxidant. Surprisingly, it is believed that vaporization of the deoxidant contributes to faster removal of oxygen as compared to, for example, melting of the deoxidant. While not being bound by theory, the vapor is more effective than a liquid to reach the surface area thoroughly and quickly to perform the deoxidation function at a faster reaction rate. Beneficially, this faster reaction time reduces the amount of time that the powder is exposed to the heat and, thus, reduces the probability of the metal particles sintering or fusing to one another through diffusion bonding. In some aspects, the predetermined time period is less than about 10 hours. In some aspects, the predetermined time period is less than about 5 hours. In some aspects, the predetermined time period is less than about 2 hours.

While under vacuum, the powder blend is heated to the predetermined temperature and maintained at that predetermined temperature for the predetermined time. This produces a very-fine-powder cake including a low-oxygen very-fine powder and an oxidized deoxidant. In some aspects, the low-oxygen very-fine powder has an oxygen content of less than about 2000 parts-per-million. In some further aspects, the low-oxygen very-fine powder has an oxygen content of less than about 1300 parts-per-million. In some yet further aspects, the low-oxygen very-fine powder has an oxygen content of less than about 1100 parts-per-million. In some still yet further aspects, the low-oxygen very-fine powder has an oxygen content of less than about 800 parts-per-million. In some additional aspects, the low-oxygen very-fine powder has an oxygen content of less than about 600 parts-per-million. In some yet additional aspects, the low-oxygen very-fine powder has an oxygen content of less than about 500 parts-per-million.

In some aspects, the deoxidation is carried out in an abundance of deoxidant. In some aspects, the amount of oxygen to be removed is calculated and an amount of deoxidant in slight excess to that needed to remove that amount of oxygen is added to the very-fine powder. While not being bound by theory, it is believed that the oxidized deoxidant, which has a higher vaporization point than the deoxidant, acts as a coating on the metal particles. Surprisingly, this further reduces the probability of the metal particles fusing.

The very-fine-powder cake is milled to produce a low-oxygen very-fine-powder blend. If the very-fine powder includes any satellites, these satellites can be removed simultaneously with the milling to produce a uniform particle-size distribution with a more uniform surface area-to-volume ratio distribution. Beneficially, this reduces the overall number of steps required to produce the low-oxygen very-fine powder and, thus, reduces the overall time and cost of manufacturing the low-oxygen very-fine powder.

After milling, the deoxidant residue is removed from the low-oxygen very-fine-powder blend to thereby produce the low-oxygen very-fine powder. In some aspects, the low-oxygen very-fine-powder blend is treated chemically to remove the oxidized deoxidant. The resultant low-oxygen very-fine powder has an oxygen content of less than about 800 parts-per-million. In some aspects, the low-oxygen very-fine powder has an oxygen content of less than about 600 parts-per-million. In some aspects, the low-oxygen very-fine powder has an oxygen content of less than about 500 parts-per-million. The low-oxygen very-fine powder may then be packaged without increasing the interstitial oxygen content.

For use in additive manufacturing processes, titanium powders need an oxygen concentration no more than, for example, 2000 parts-per-million. Because titanium powders used in additive manufacturing processes will scavenge oxygen when exposed to elevated temperatures, titanium powders for use in additive manufacturing processes have an oxygen concentration that is generally less than half the maximum acceptable oxygen concentration. Beneficially, low-oxygen very-fine powders produced in accordance with the present disclosure may provide increased longevity of very-fine powders prior to the very-fine powder becoming a spent powder by providing oxygen concentrations that are much less than half the maximum oxygen concentration.

According to additional aspects of the present disclosure, a low-cost, low-oxygen, very-fine powder is produced from spent powder used in additive manufacturing. In some aspects, the high-oxygen very-fine powder is spent powder that is obtained after use in additive manufacturing processes. The oxygen content of these spent powders is necessarily near or above the upper limit of allowable specifications for use in additive manufacturing. Surprisingly, the spent powder can be mixed with an amount of deoxidant, placed under vacuum, heated, milled, and the deoxidant residues removed as described above to produce a low-oxygen very-fine powder that is suitable in applications such as feedstock for additive manufacturing. Beneficially, processing spent powders in accordance with the present disclosure may reduce the oxygen content of the spent powder without substantially altering other characteristics of the spent powder, such as particle-size distributions or shapes.

Systems, methods, and compositions in accordance with the present disclosure can produce low cost, low oxygen spherical powders of, for example, titanium and titanium alloys. High-oxygen spherical powders may be obtained from titanium metal or other forms of titanium, or may be obtained from spent powders. Surprisingly, the high-oxygen spherical powders can be mixed with an amount of deoxidant, placed under vacuum, heated, milled, and the deoxidant residues removed as described above to produce a low-oxygen spherical powder. Beneficially, processing spherical powders in accordance with the present disclosure may produce low-oxygen spherical powders without substantially altering beneficial characteristics of the high-oxygen spherical powders, such as particle-size distributions or shapes. In addition to the benefits described above, processing spherical powders in accordance with the present disclosure also provides for lower overall oxygen content of the produced low-oxygen spherical powder because higher temperature processes such as plasma spheroidization, which can increase oxygen content, are performed prior to deoxidizing.

While the above aspects have been described with respect to titanium and titanium alloys, the disclosure is not so limited. It is contemplated that the above-described aspects have applicability to other metals such as zirconium, hafnium, vanadium, niobium, tantalum, combinations thereof, and the like.

All numerical values of parameters (e.g., of quantities or conditions) in this specification, including the appended claims, are to be understood as being modified in all instances by the term "about" whether or not "about" actually appears before the numerical value. "About" indicates that the stated numerical value allows some imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, in some circumstances, "about" indicates variations of ±10%. In some further circumstances, "about" indicates variations of ±5%.

All numerical values of parameters (e.g., of quantities or conditions) in this specification, including the appended claims, are to be understood as being modified in all instances by the term "substantially" whether or not "substantially" actually appears before the numerical value. "Substantially" indicates that the stated numerical value allows some slight imprecision (with some approach to exactness in the value; approximately or reasonably close to the value; nearly). If the imprecision provided by "substantially" is not otherwise understood in the art with this ordinary meaning, then "substantially" as used herein indicates at least variations that may arise from ordinary methods of measuring and using such parameters. For example, in some circumstances, "substantially" indicates variations of ±2.5%. In some further circumstances, "substantially" indicates variations of ±1%.

While the best modes for carrying out the disclosure have been described in detail, those familiar with the art to which this disclosure relates will recognize various alternative designs and embodiments for practicing the disclosure within the scope of the appended claims.

What is claimed is:

1. A method comprising:
   obtaining a high-oxygen very-fine powder including titanium;
   adding an amount of deoxidant to the high-oxygen very-fine powder to thereby produce a powder blend;
   applying a vacuum to the powder blend;
   heating the powder blend to a predetermined temperature sufficient to at least partially vaporize the deoxidant at a pressure of the vacuum to produce a vaporized deoxidant;
   vapor deoxidizing the high-oxygen very-fine powder using the vaporized deoxidant to produce a low-oxygen very-fine powder and an oxidized deoxidant;
   wherein the low-oxygen very-fine powder has an oxygen content less than the high-oxygen very-fine powder;
   maintaining the powder blend at the predetermined temperature for a predetermined time to produce a very-fine-powder cake, the very-fine-powder cake including the low-oxygen very-fine powder and the oxidized deoxidant, the low-oxygen very-fine powder including the titanium, the predetermined time being sufficient to convert the high-oxygen very-fine powder to the low-oxygen very-fine powder;
   milling the very-fine-powder cake to produce a low-oxygen very-fine-powder blend; and
   removing the oxidized deoxidant from the low-oxygen very-fine-powder blend to thereby produce the low-oxygen very-fine powder.

2. The method of claim 1, wherein the low-oxygen very-fine powder has an oxygen content of less than about 2000 parts-per-million.

3. The method of claim 1, wherein the low-oxygen very-fine powder has an oxygen content of less than about 1300 parts-per-million.

4. A method comprising:
   obtaining a high-oxygen spherical powder including titanium, the high-oxygen spherical powder defining a first particle-size distribution;
   adding an amount of deoxidant to the high-oxygen spherical powder to thereby produce a powder blend;
   applying a vacuum to the powder blend;
   heating the powder blend to a predetermined temperature sufficient to at least partially vaporize the deoxidant at a pressure of the vacuum to produce a vaporized deoxidant;
   vapor deoxidizing the high-oxygen spherical powder using the vaporized deoxidant to produce a low-oxygen spherical powder and an oxidized deoxidant;
   wherein the low-oxygen spherical powder has an oxygen content less than the high-oxygen spherical powder; and
   maintaining the powder blend at the predetermined temperature for a predetermined time to produce a spherical-powder cake, the spherical-powder cake including the low-oxygen spherical powder and the oxidized deoxidant, the low-oxygen spherical powder including the titanium, the low-oxygen spherical powder defining a second particle-size distribution that is substantially equal to the first particle-size distribution, the predetermined time being sufficient to convert the high-oxygen spherical powder to the low-oxygen spherical powder;
   milling the spherical-powder cake to produce a low-oxygen spherical-powder blend; and
   removing the oxidized deoxidant from the low-oxygen spherical-powder blend to thereby produce the low-oxygen spherical powder.

5. The method of claim 4, wherein the low-oxygen spherical powder has an oxygen content of less than about 1300 parts-per-million.

6. The method of claim 4, wherein the low-oxygen spherical powder has an oxygen content of less than about 1100 parts-per-million.

7. The method of claim 4, wherein the low-oxygen spherical powder has an oxygen content of less than about 800 parts-per-million.

8. The method of claim 4, wherein the low-oxygen spherical powder has an oxygen content of less than about 500 parts-per-million.

9. The method of claim 4, wherein the predetermined temperature is less than about 1700° F.

10. The method of claim 4, wherein the predetermined temperature is less than about 1500° F.

11. The method of claim 4, wherein the low-oxygen spherical powder has an oxygen content of less than about 2,000 parts-per-million such that the low-oxygen spherical powder is configured for use in additive manufacturing processes without further alteration to physical properties of the low-oxygen spherical powder.

12. The method of claim 4, wherein the high-oxygen spherical powder defines an average particle size of less than about 105 μm.

13. The method of claim 4, wherein the high-oxygen spherical powder defines an average particle size of less than about 63 μm.

14. The method of claim 4, wherein the high-oxygen spherical powder defines an average particle size of less than about 45 μm.

15. The method of claim 4, wherein the high-oxygen spherical powder defines an average particle size of less than about 25 μm.

16. A method comprising:
obtaining a high-oxygen spherical powder including titanium;
wherein the high-oxygen spherical powder includes spent powder from an additive manufacturing process;
adding an amount of deoxidant to the high-oxygen spherical powder to thereby produce a powder blend;
applying a vacuum to the powder blend;
heating the powder blend to a predetermined temperature sufficient to at least partially vaporize the deoxidant at a pressure of the vacuum to produce a vaporized deoxidant;
vapor deoxidizing the high-oxygen spherical powder using the vaporized deoxidant to produce a low-oxygen spherical powder and an oxidized deoxidant;
wherein the low-oxygen spherical powder has an oxygen content less than the high-oxygen spherical powder;
maintaining the powder blend at the predetermined temperature for a predetermined time to produce a spherical-powder cake, the spherical-powder cake including the low-oxygen spherical powder and the oxidized deoxidant, the low-oxygen spherical powder including the titanium, the predetermined time being sufficient to convert the high-oxygen spherical powder to the low-oxygen spherical powder;
milling the spherical-powder cake to produce a low-oxygen spherical-powder blend; and
removing the oxidized deoxidant from the low-oxygen spherical-powder blend to thereby produce the low-oxygen spherical powder.

17. The method of claim 16, wherein the low-oxygen spherical powder has an oxygen content of less than about 2000 parts-per-million.

* * * * *